Sept. 25, 1962  J. G. McKAY  3,055,245
PREPOSITIONING CHUCK
Filed Feb. 18, 1960  4 Sheets-Sheet 1
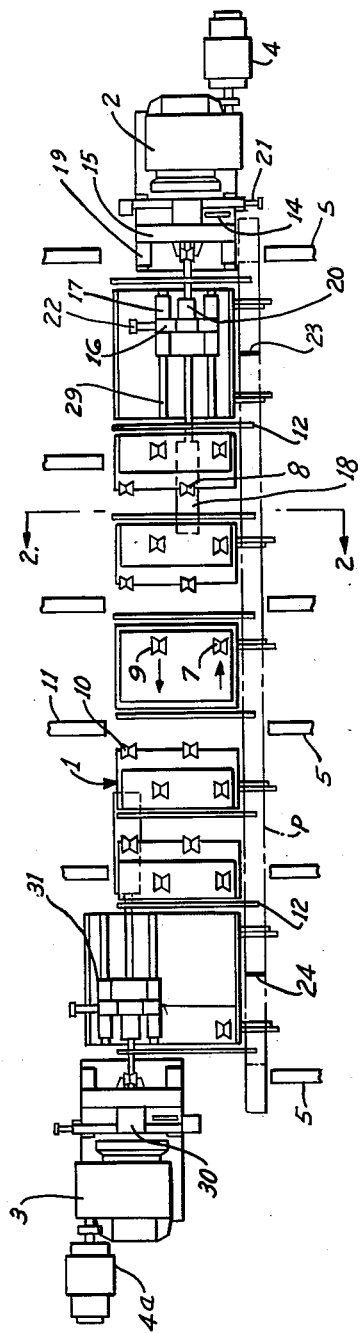
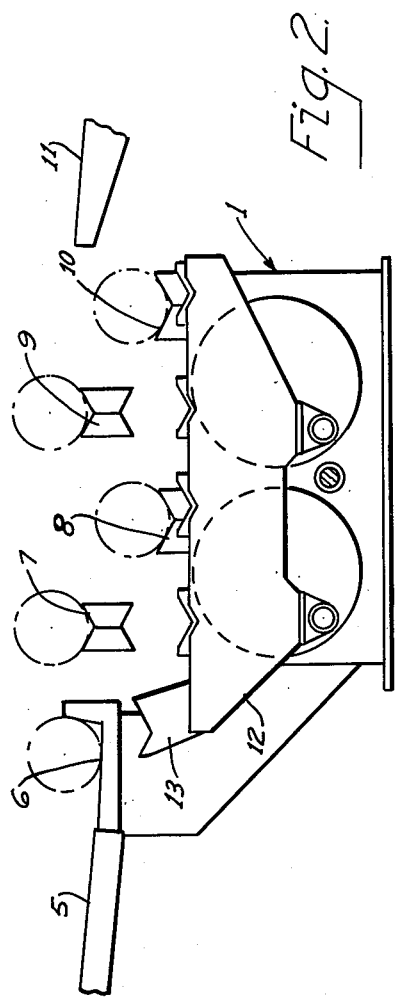
INVENTOR.
John G. McKay,
BY John H. Leonard,
his ATTORNEY.

Sept. 25, 1962   J. G. McKAY   3,055,245
PREPOSITIONING CHUCK
Filed Feb. 18, 1960   4 Sheets-Sheet 2
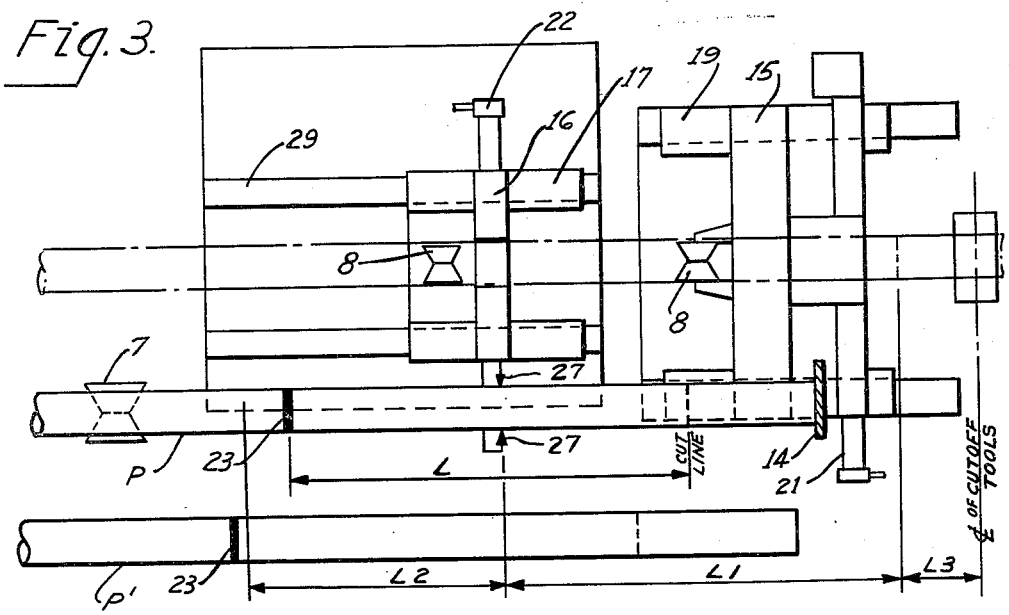
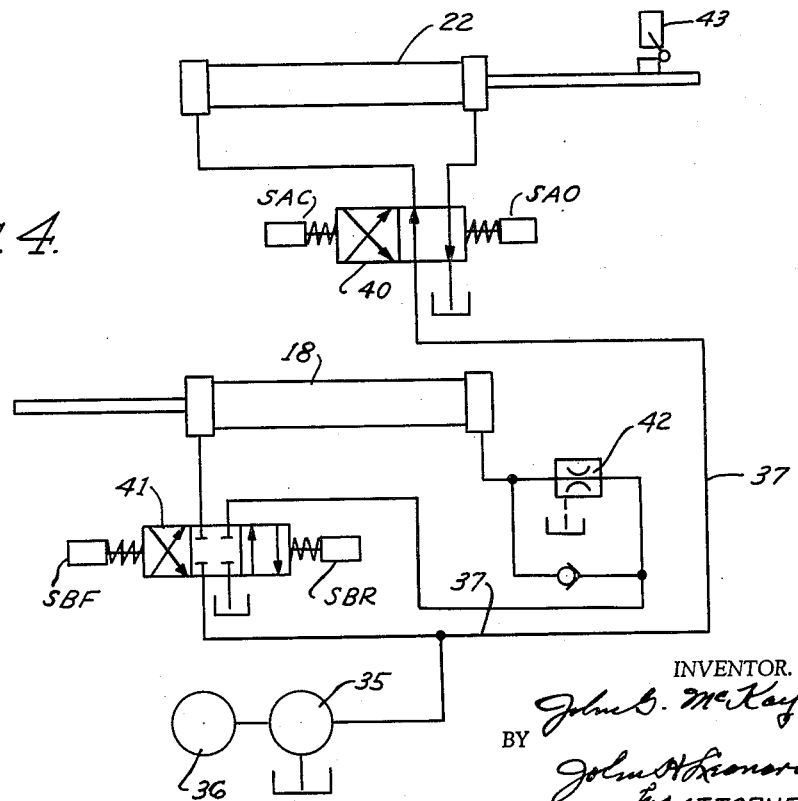
INVENTOR.
John G. McKay,
BY John H. Leonard,
his ATTORNEY.

United States Patent Office 3,055,245
Patented Sept. 25, 1962

3,055,245
PREPOSITIONING CHUCK
John G. McKay, South Euclid, Ohio, assignor to The Pipe Machinery Company, Wickliffe, Ohio, a corporation of Ohio
Filed Feb. 18, 1960, Ser. No. 9,497
9 Claims. (Cl. 82—48)

This invention relates to a prepositionng chuck for feeding elongated lengths of stock endwise into a machine so that machining operations can be performed on successive lengths, respectively, each at a preselected distance from its end different from that in the case of its predecessor.

For the purpose of illustration, the invention is described herein as applied to the cropping of end portions of pipes, its use in connection with other machining operations and for other types of elongated stock being readily apparent from the illustrative example.

Particularly, the present invention is disclosed in connection with a transfer table by which the pipes are transferred from station to station transversely of their lengths into endwise alignment with machines for operating first on one end of each length of pipe and then on the other end.

Heretofore, in the positioning of lengths of pipe with such tables, the customary practice has been to position the lengths of pipe, successively, endwise in a positioning station preparatory to moving each transversely into endwise alignment with the machine. This was done by driving each length of pipe endwise by suitable rolls of the positioning station until the end of the pipe engaged a suitable stop which stopped the pipe in an endwise position such that, when the pipe was subsequently transferred transversely to a machining station, it would be disposed in proper position endwise to be engaged and moved by a chuck the proper distance endwise into the machine. This practice was quite satisfactory so long as machining operations on a large number of pipes were to be performed at a fixed distance from the end of each length.

However, it happens in some instances that different lengths of crop must be cut off of the ends of successive pipes. In such cases, the mere endwise positioning of each successive length of pipe by driving it endwise against a fixed stop is not satisfactory. Instead, it is desirable to move each length of pipe to a predetermined endwise position dictated by the distance from the end at which the machining or cut-off operation is to be performed.

In the illustrative example, this position is determined by the amount of crop that has been removed. This ordinarily requires rough feeding of the pipe endwise to the preselected position, then the final positioning of the pipe by manipulation by the workman in accordance with his direct observation of the pipe. Sometimes the expense of such manipulation is so great that it is preferable to cut off from each end of the pipe more crop than ordinarily would be necessary to assure that most of the pipes would be cropped far enough from the ends to remove all the objectionable portions.

The present structure is one which roughly positions a length of pipe endwise before it is aligned with the machine. Next, it prepositions, endwise of the pipe, a prepositioning chuck, aligned with the machine, preparatory to the transfer of the pipe laterally to the prepositioning chuck. This endwise prepositioning of the prepositioning chuck is in relation to a preselected machining position on the pipe. As a result, in the final feeding of the pipe endwise to the machine, the pipe will be advanced to exactly the right place for the machining operation regardless of the distance that particular machining operation may be from the end of the pipe. The pipe is fed laterally to the prepositioned prepositioning chuck by which it is gripped and fed endwise to a feed chuck. The feed chuck, in turn, grips the pipe in such relation to the prepositioning chuck that the pipe is advanced by the feed chuck into the machine the exact distance required to effect the cut-off at the preselected location.

One of the principal objects of the present invention is to provide an apparatus for prepositioning lengths of stock endwise in succession preparatory to feeding them into a machine so that, when each is fed into the machine, a machining operation will be performed at the proper preselected location even if the machining operations on the successive lengths of pipe are to be performed a different distance from the end in the case of some pipes than in the case of others.

Another object is to preposition the prepositioning chuck automatically in response to indicia placed on the pipe.

Various other objects and advantages will become apparent from the following description, wherein reference is made to the drawings, in which:

FIG. 1 is a diagrammatic top plan view of a pipe transfer mechanism and two spindle machines arranged for operating on opposite ends of each of a number of lengths of pipe, successively, and embodying the apparatus of the present invention;

FIG. 2 is a diagrammatic vertical cross sectional view of the mechanism illustrated in FIG. 1, and is taken on line 2—2 of FIG. 1;

FIG. 3 is a diagrammatic fragmentary top plan view of the right end of the apparatus illustrated in FIG. 1;

FIG. 4 is a hydraulic flow diagram showing the mechanism for operating the chucks;

Figure 5:
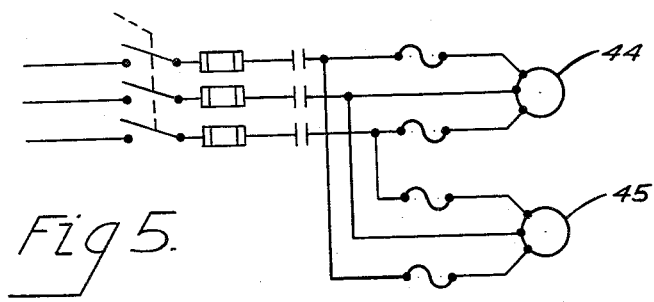
FIG. 5 is a wiring diagram showing the feed roll motors.
Figure 6:
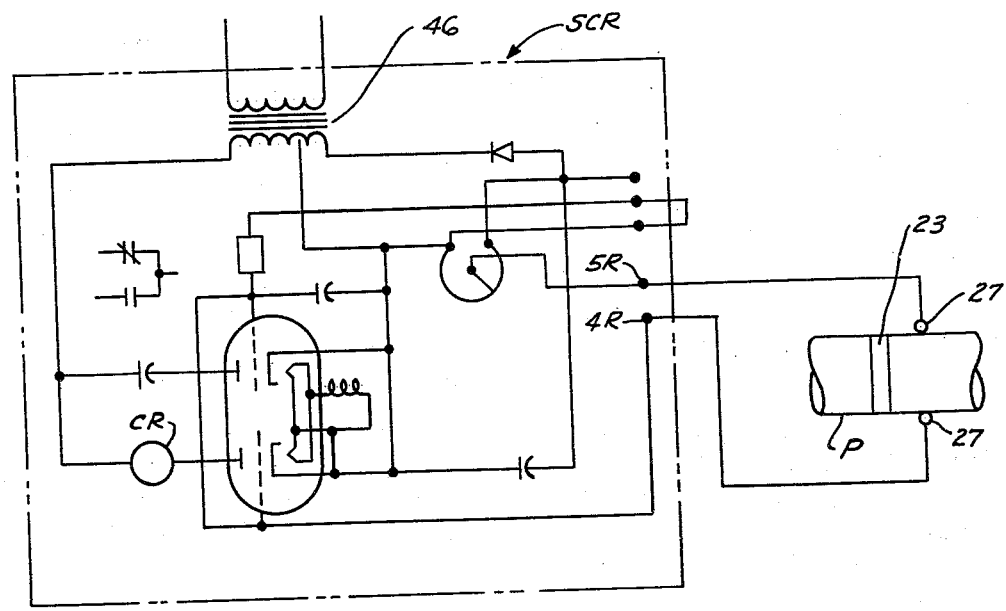
FIG. 6 is a diagram illustrating a type of resistance sensitive relay that may be used in the invention.

Referring first to FIG. 1, there is shown a transfer mechanism, indicated generally at 1, which machines 2 and 3 arranged at opposite ends, respectively, thereof. The machines are driven by suitable motors 4 and 4a, respectively. The transfer mechanism may be one such as disclosed in United States Letters Patent No. 2,728,327, issued to William L. Benninghoff et al. on December 27, 1955.

The specific types of machines are relatively unimportant, but are such that the stock is fed endwise therethrough. For the purposes of illustration, the machines shown are cut-off machines for cutting off the undesirable end portions or crops of pipes and for chamfering the ends of the remaining lengths. They may be such as are more fully described in my copending application, Serial No. 12,447, filed March 2, 1960, and entitled "Mechanism for Steadying and Cropping the Ends of Elongated Stock".

The transfer mechanism comprises a feed skid 5 down which the uncropped lengths of pipe P are rolled laterally to a pick-up station 6. Arranged in order transversely of the transfer mechanism 1 are a row of live or driven rolls 7 for driving the pipes endwise toward the end of the mechanism at which the machine 2 is located, a row of idle rolls 8 aligned endwise of the row with the machine 2, a row of live or driven rolls 9 driving toward the opposite end of the mechanism, a row of idle rolls 10 aligned with the machine 3, and a discharge skid 11.

The mechanism includes a plurality of transfer racks 12 which are aligned with each other endwise of the mechanism. The racks are power driven so as to orbit concurrently in parallel vertical planes while maintaining their endwise alignment with each other. As more fully described in the above identified patent to Benninghoff et al., each rack has a pick-up portion 13 adapted to engage the pipe in the pick-up station 6 and to transfer it to driven rolls 7 which constitute the approximate positioning station for the machine 2, in which the pipe is approximately positioned endwise by engaging at its end a stop 14.

At each successive orbit of the racks 12, the pipes are transferred to the next succeeding stations, all in a well-known manner. The station next beyond the approximate positioning station for the machine 2 is provided by the idle rolls 8 and is a prepositioning and machining station for the machine 2.

At the end of the mechanism adjacent the machine 2 are a feed chuck 15 and a prepositioning chuck 16. The prepositioning chuck 16 is mounted on a carriage 17 which is reciprocable endwise of the transfer mechanism and pipes by a reversible hydraulic piston and cylinder assemblage 18.

The feed chuck 15 is aligned with the machine 2 and is mounted on a carriage 19 which is slidable on suitable slideways toward and away from the machine 2. This movement may be effected by a suitable reversible hydraulic piston and cylinder assemblage 20, controlled as hereinafter described. The gripping jaws of the chuck 15 are operated by a suitable piston and cylinder assemblage 21, and those of the chuck 16 by a suitable piston and cylinder assemblage 22.

Thus the chuck 15 can be moved to the left a fixed distance and in that position grip the pipe. It can then be moved a fixed distance to the right. In the latter position, it holds the pipe for cropping by the machine 2. Accordingly, when a length of pipe is fed to the chuck 15 in the proper endwise position, the chuck 15, by gripping the pipe and advancing a fixed distance, will advance the pipe exactly to the position required to dispose a preselected portion of the pipe within the head of the machine for cutting off at the right place. The chuck 15 may be of the type disclosed in U.S. Letters Patent No. 2,798,234, issued July 9, 1957, to W. L. Benninghoff et al.

Since the conditions of the end portions of pipes vary, the cut-off location may be different distances from the end for different pipes. Therefore, the stock, after being stopped by the stop 14 at the approximate endwise position, cannot be put into the feed chuck 15 in the endwise approximate position in which stopped. Instead, it must be accurately prepositioned before gripping by the chuck 15.

For this purpose, a marking band 23 is placed on the end portion of a pipe at the position were the cutting operation is to be performed or a predetermined fixed distance therefrom. This marking is done by an inspector, the marking material preferably being an electrical insulating paint. Usually both ends are to be cropped so a like marking band 24 is applied to the cut-off position at the other end of the pipe. The location of the marking bands depends upon the condition of the end portions of the pipe itself.

Mounted on the frame of the machine adjacent the feed chuck 15 is a normally closed limit switch, later to be described, which controls the operation of the driven rolls 7 by controlling their electrical driving motors. The switch maintains these rolls normally active until it is engaged by a length of pipe, whereupon it breaks the circuit, stopping the rolls 7 and thereby positioning the pipe in approximate position endwise.

Next, the assemblage 18 is operated for advancing the prepositioning chuck 16 toward pick-up position. The chuck 16 advances until a pair of sensitive relay probes 27 movable therewith engage the insulating band 23 which breaks a control circuit through the probes. Breaking the circuit stops the travel of the chuck 16 in a specific endwise position relative to the band 23 and hence a specific distance to the left of the point where cutoff is to occur. This specific distance is such that when the chuck 16 is finally advanced toward the machine 2 to its forwardmost position against a positive stop 16a and the chuck 15 is in its most retracted position, the chuck 15 can engage the pipe at exactly the right place so that when the chuck 15 subsequently is moved to its final advanced position, the point at which cutoff is to occur will be in exactly the right position relative to the cut-off mechanism or tools of the machine 2.

For this purpose, the carriage 17 of the chuck 16 is mounted on a slide 29 with its driving mechanism under the control of the probes 27. When the pipe is stopped in approximate position by the limit switch of the rolls 7, the circuit to the brush probles 27 is energized. So long as the probes 27 are making electrical contact with the pipe, which is moved to position on the live rolls 7 as the pipe advances toward the machine 3, the chuck 16 advances toward pick-up position. However, when the probes 27 engage the insulating band 23 on the pipe, the chuck 16 is stopped. Next, the transfer mechanism is operated to transfer the pipe from the live rolls 7 to the idle rolls 8 with which the chuck 16 is aligned. When the pipe is removed from the live rolls 7, the immediately begin to drive in the feeding direction, ready for repetition of their feeding operation on the next length of pipe.

On the other hand, when the pipe is moved onto the idle rolls 8, the chuck 16 has already been positioned to grip the pipe at a predetermined distance from the insulating band 23. Accordingly, when the pipe is lowered onto the rolls 8, the chuck 16 grips the pipe and then starts and moves forwardly to a fixed stopped position. In this fixed stopped position, it has advanced the pipe so that the band 23, and therefore the cut-off point, is in exactly the correct predetermined endwise position relative to the new retracted chuck 15. Thereupon, the chuck 15 is operated to clamp onto the pipe. When the chuck 15 advances its full fixed distance toward the machine 2, the cut-off point is disposed in the proper position relative to the cut-off mechanism of the machine 2 so that the pipe will be cut off at the band 23 or at a fixed distance therefrom. The length of crop does not in any way effect the operation. The cycle of the chuck 15 is separately controlled. After the machining operation, the chuck 15 withdraws the pipe from the machine 2 and releases it so that it can be transferred by the racks 12 upon their next orbit.

As soon as the chuck 15 has been operated to engage and grip the pipe, the chuck 16 is released and starts returning to its starting position, again ready to reposition for the next length of pipe. It does this while the machining operation is being performed.

After the machining operation has been performed by the machine 2 and retraction of the chuck 15, the next orbit of the transfer mechanism is effected. Thereby, the machined length of pipe is transferred to the live rolls 9 and by them fed to an approximate position for the machine 3. Thereupon, a feed chuck 30 and a prepositioning chuck 31, corresponding to the chucks 15 and 16, are moved to the proper position to receive the pipe when the pipe is transferred from the feed rolls 9 to the idle rolls 10.

The operation is performed by the machine 3 on the opposite end of the pipe with respect to the band 24 and is the same as that performed on the first end with respect to the band 23. After the machine 3 has performed its operation, the mechanism 1 transfers the finished pipe to the discharge skid 11.

It is thus seen that regardless of how much of the end portion of the pipe is to be removed, the chucks 16 and 31 position themselves so that the pipe, when moved thereby into position for engagement by the associated retracted feed chuck 15 or 30, is always at the right position relative to the chuck 15 or 30 so that forward feeding movement of the feed chuck to its extended position locates the pipe properly for the cut off.

As long a prepositioning movement as desired may be provided, but ordinarily the crop will not require more than a foot or so of prepositioning and this is readily obtainable.

The types of chucks used are immaterial, their main requirement being they grip the pipe firmly, hold it in coaxial position with an associated machine, and restrain the pipe from endwise, radial, and rotary movement relative to the chuck itself.

As mentioned, if it is desirable to make the machine automatic or semi-automatic, this may be done. As illustrated in FIGS. 3 through 7, a hydraulic operating mechanism and an electric control are shown, these being exemplary of a number of different types of operating and control mechanisms which may be provided. The important feature resides in the use of the paint band or other indicia on the pipe and means cooperable therewith for prepositioning the prepositioning chuck relative to the feed chuck so that the former will locate the pipe in the latter so that the latter will feed the pipe to the exact position desired regardless of the length of the crop end to be removed.

Referring first to FIG. 3, the one length of pipe $P_1$ is shown on a feed skid ready to be fed to the transfer mechanism and having been previously banded, as indicated at 23, with insulating band which is a definite distance L from the point at which the cut-off is to occur. As indicated, the pipe is disposed on the rolls 7 and thereby fed to dispose the end at the portion to be cropped against the stop 14. In this position, the probes 27 are in engagement with the pipe and are short circuited thereby so that the power means of the prepositioning chuck 16 are caused to move it toward retracted starting position until the short circuit through the probes 27 is interrupted by the insulating band 23. The distance $L_1$ indicates the distance between the cut-off line and the band 23. The distance $L_2$ indicates the maximum cropped length that can be cut off on the particular apparatus. The distance $L_3$ indicates the movement of the pipe by the feed chuck 15 after the pipe is gripped therein.

Referring to FIG. 4, the driving mechanism for the prepositioning chuck 16 is illustrated in more detail. In the form illustrated, a hydraulic mechanism is employed, the hydraulic pressure being supplied by a pump 35 driven by a motor 36. One branch of a pressure line 37 leads from the pump 35 to a reversing valve 40 through which pressure fluid is supplied to opposite ends of the cylinder 22. The reversing valve 40 is arranged to be remotely controlled by means of solenoids SAC and SAO. By manipulating the valve 40, the jaws of the prepositioning chuck 16 are opened and closed. Another branch of the feed line 37 leads to a reversing and stop valve 41 through which pressure fluid is supplied to opposite ends of the cylinder 18. A suitable flow control valve 42 is connected between the valve 41 and the head end of the cylinder 18 for throttling and controlling the pressure fluid admitted. The valve 41 is operated by solenoids SBF and SBR so that the valve can be controlled remotely. Admission of pressure fluid to the head end of the cylinder 18 advances the prepositioning chuck 16.

A limit switch 43 is operated by the jaw operating assemblage 22 of the prepositioning chuck when the prepositioning chuck releases the pipe or stock. This operation of the limit switch 43 initiates the operation of the cut-off or machining cycle.

The motors for driving the feed rollers 7 and 9 are indicated at 44 and 45, these preferably being the conventional alternating current motors arranged to be started and stopped by suitable switches.

The resistance sensitive relay SCR used in connection with the probes 27 may be any one of a number of such relays available on the market. The one illustrated in FIG. 6 may be powered through a suitable transformer means 46 from the usual 110 volt 60 cycle source. This particular relay illustrated is one which is sold by Cutler-Hammer, Inc., of Milwaukee, Wisconsin, and is described in their Bulletin No. 13532. Since the details thereof form no part of this invention, the relay itself is not described in detail. It need only be pointed out that it is arranged for normally energized relay operation so that the control relay CR thereof is energized when the sensitive circuit through the terminals $4_R$ and $5_R$ is open, which occurs when the insulating band 23 is between the probes or brushes 27.

Figure 7:
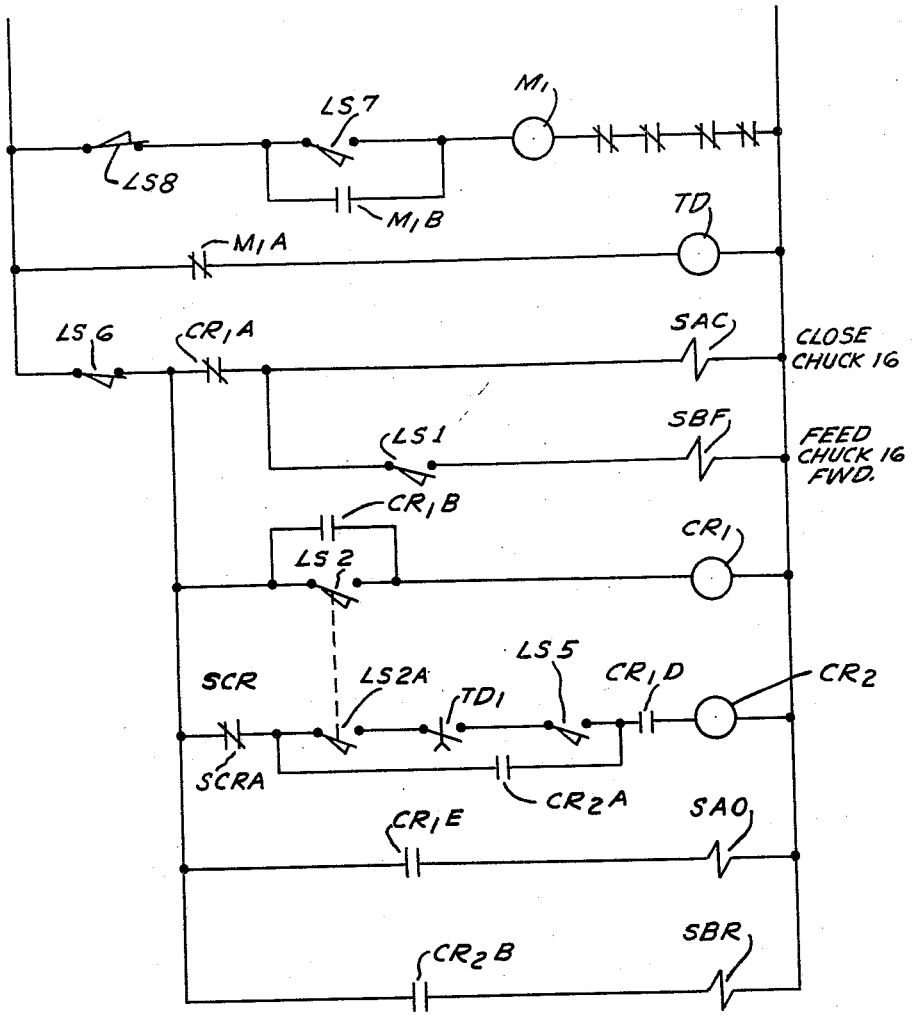
FIG. 7 is a wiring diagram showing the electric control of the apparatus illustrated in FIGS. 1 and 2.

The operation of the chucks can best be understood by reference to the wiring diagram of FIG. 7 which discloses the electrical control circuit.

First, it is to be noted that the feed chuck 15 is arranged so that when its jaws close, a cycle is initiated by which it advances a fixed distance toward the machine 2 for the cut-off operation, remains in that position for the cutting-off operation, then retracts slightly so that the machine 2 sets up for chamfering, and again advances a slight amount for the chamfering operation. After the chamfering operation, the chuck 15 fully withdraws the pipe from the machine 2, after which its jaws open so that the pipe can be picked up and transferred to the next succeeding row of rolls 9 on the next orbit of the racks 12.

This operating cycle of the chuck 15 may be initiated by the proper positioning of the prepositioning chuck 16, but after initiated, it is controlled entirely by its own controls independently of any operation of the prepositioning chuck 16. Thus, the prepositioning chuck 16 is free to again position itself for receiving the next length of pipe while the chuck 15 is performing its cycle and the cutting operation is being completed.

The particular controls and cycles of the chuck 15 form no part of the present invention which is directed to properly positioning the pipe for reception by the chuck 15.

At starting, it is assumed that a length of pipe P is on the rolls 7 and has been moved thereby against the stop 14. It is then in the approximate position, ready to be transferred to the next succeeding row of rolls 8 which are to feed it to the chuck 15 so that it can be fed, in turn, by the chuck 15 to the machine 2.

The prepositioning chuck is assumed to have been properly positioned with respect to the pipe while the pipe remained on the feed rolls 7 and to be standing in position with its jaws open to receive the pipe when it is transferred from the rolls 7 to the rolls 8 by the transfer racks 12.

The transfer racks transfer the pipe from the roll 7 onto the rolls 8, to dispose the pipe between the open jaws of the prepositioning chuck 16. When the pipe is placed in this position, a limit switch $LS_6$ is closed, and through normally closed contacts $CR_1A$ of a control relay $CR_1$ energizes the solenoid SAC causing it to operate the hydraulic reversing valve 40 which, in turn, supplies fluid to the assemblage 22 and causes it to close the jaws of the prepositioning chuck 16. When the jaws of the chuck 16 close, they close a limit switch $LS_1$ and energize the solenoid SBF through normally closed contacts $CR_1A$ and limit switch $LS_6$. Energization of the solenoid SBF operates the hydraulic stop and reversing valve 41 which supplies fluid pressure to the assemblage 18 so as to cause that assemblage to advance the chuck 16 forwardly to the end of its stroke, thus advancing the pipe toward the chuck 15 and machine 2.

When the chuck 16 reaches the end of its forward or feed stroke, it closes a limit switch $LS_2$. The closure of the limit switch $LS_2$ closes limit switch $LS_2A$ and also energizes the relay $CR_1$, whereupon the normally closed contacts $CR_1A$ open and normally open contacts $CR_1B$, $CR_1D$ and $CR_1E$ close. The opening of the normally closed contacts $CR_1A$ de-energizes the solenoids SAC and SBF. De-energization of the solenoid SBF arrests further forward movement of the chuck 16. At the same time, the closure of the normally open contacts $CR_1E$ energizes the solenoid SAO which opens the jaws of the chuck 16. Concurrently, the now closed contacts $CR_1D$ set up a partial circuit through the control relay $CR_2$. Operation of the assemblage 22 to move the jaws to open position operates the limit switch 43 which is in the circuit for controlling the operation of the chuck 15 and the machine 2. Once this switch is tripped, this supplemental control circuit passes through its cycle of operations independently of further operation of the chuck 16 and its control circuit.

The opening of the jaws of the prepositioning chuck 16 closes a limit switch $LS_5$. At this time the normally open contacts $CR_1D$ are closed. The limit switch $LS_2A$ is now closed, it having been closed when the limit switch $LS_2$ was closed at the end of the advance of the feed chuck 16. The normally open contacts $CR_1B$ also have been closed and are now maintaining a holding circuit through the control relay $CR_1$.

A sensitive relay SCR cooperates through the prods 27 with the pipe. The prods are in engagement with the pipe at some point other than on the painted band 23. Therefore, there is a short circuit across the prods and, when such a condition exists, the contacts SCRA of the sensitive relay SCR are closed. They are arranged to open when the short circuit across the prods is broken by the insulating paint band 23 on the pipe.

Accordingly, a circuit is established across the source through a relay $CR_2$, except for a normally open time delay switch $TD_1$ which is operated by the endwise driving mechanism. At the time that the transfer racks 12 place the pipe on the rolls 8, another pipe is laid on the rolls 7. When the first pipe was laid on the rolls 7, the roll driving motors for driving the pipe endwise against the stop 14 to its approximate endwise position were operating. However, they were stopped when the pipe struck and opened limit switch $LS_3$. This lifting of the pipe from the rolls 7 causes limit switch $LS_8$ to close, closes a limit switch $LS_7$ which re-energizes the motors 44 and 45, energizes relay $M_1$, opens the normally closed contacts $M_1A$ and closes the normally open contacts $M_1B$. The closing of the contacts $M_1B$ establishes a holding circuit for maintaining the relay $M_1$ energized. The opening of $M_1A$ deenergizes a holding coil TD of a normally open time delay switch $TD_1$ which is normally open but had been held closed. When the switch $TD_1$ was closed, a complete circuit was established across the line from the sensitive relays through the control relay $CR_2$, thus closing $CR_2A$ and establishing a holding circuit in by-passing relation to the switch $LS_2A$, the time delay switch $TD_1$ and the limit switch $LS_5$. At the same time, the closure of the contacts $CR_2B$ of the control relay $CR_2$ energized the solenoid SBR which operates the valve 41 so as to supply pressure fluid to the assemblage 18 to cause the prepositioning chuck to return toward its starting position. During this operation, the motors 44 and 45 remain energized for driving the pipe 7 forwardly. When the pipe is moved against the stop 14, it again opens the switch $LS_8$ which deenergized the relay $M_1$ and thereby stopped the motors. When the contacts $M_1A$ open, the time delay switch is deenergized and drops out after a time delay and will not be reenergized until the circuit through the limit switch $LS_7$ and the limit switch $LS_8$ is reestablished. Generally, the switch $LS_7$ closes about fifteen degrees after the transfer racks lift the pipe off of the roll 7 and opens about forty-five degrees before the transfer racks lay the pipe on the rolls 8.

As the chuck 16 returns toward starting position, the prods 27 ride along the pipe in short circuit relation, maintaining the sensitive relay SCR energized so that the contacts SCRA remain closed, the circuit being maintained through the holding circuit of contact $CR_2A$ regardless of what may be the condition of the switches $LS_2A$, $TD_1$ and $LS_5$. As soon as the painted band 23 is engaged by the prods 27, the circuit through the prods is broken and the sensitive relay SCR becomes deenergized, whereupon the normally closed contacts SCRA are opened, breaking the circuit through the control relay $CR_2$. Breaking of the circuit through the relay $CR_2$ causes the contacts $CR_2A$ to reopen, thus eliminating the holding circuit, and causes the normally open contacts $CR_2B$ to reopen, thus deenergizing the solenoid SBR and therefore causing the valve 41 to move to neutral position and thereby discontinue the supply of pressure fluid to the assembly 18. This stops the prepositioning chuck 16 in a position determined by the paint band 23 on the pipe lying on the rolls 7. In this position, it is ready to receive the pipe which is on the rolls 7 as soon as that pipe is transferred to the rolls 8. When it receives the pipe from the rolls 7, the cycle is repeated and the prepositioning chuck 16 advances to a predetermined position, regardless of how far from the end of the pipe the painted band was arranged. Since the chuck 16 advances to a fixed position, all of the pipe, from the leading end to a certain distance from the painted band passes through the chuck 15 and the machine 2, the pipe end portion extending therebeyond if necessary so that the gripping of the pipe by the chuck 15 occurs at a predetermined fixed distance from the painted band. As a result, since the chuck 15 advances a fixed distance and then returns, the cut-off occurs at a predetermined fixed distance from the painted band.

Any and all of the pipe from the leading end to a predetermined distance from the painted band, regardless of the length thereof, is severed and is passed through the machine 2 and discharged from the end opposite from the feed mechanisms. When the chuck 16 stops on its return movement to retracted position, it is hydraulically locked by the valve 41 because both the solenoids SBF and the solenoids SBR are deenergized.

It appears, therefore, that in accordance with the present arrangement, the formed pipe is first inspected to determine at what point cropping shall occur. When this point is determined, a suitable band of insulating material, such as insulating paint, is painted on the pipe at a predetermined location. This location is always a given distance from the point at which the cut-off is to be effected. After the pipe has been painted, it is placed on the rack ready to roll sidewise down the feed skid and to be placed by the transfer mechanism on the set of rolls 7. At the beginning of a cycle, the one pipe is released and rolls onto the rolls 7 which are active. Thereupon, they advance the pipe in a direction of the machine 2. When the pipe is moved a predetermined distance in this direction, its end strikes the stop 14, whereupon the driving of the rolls 7 is discontinued. With the pipe in this approximate position, the control of the prepositoining chuck 16 takes charge of the chuck which thereupon moves so that it is positioned at a predetermined fixed relation with respect to the insulating band 23 on the pipe, this being determined by the interruption of the circuit through the prods 27, by the band itself. Accordingly, when the pipe is transferred from the rolls 7 to the rolls 8 which are non-driven rolls, it is laid in the position in the chuck 16 with the painted band a predetermined distance from the chuck jaws. The chuck 16 thereupon advances to a predetermined position with respect to the machine 2, advancing the end of the pipe through the chuck 15 and the machine 2 to the extent necessary as to permit the chuck 16 to reach its predetermined position. When it reaches its final position, its jaws open and the jaws of the chuck 15 close. Immediately, the machining cycle is begun and a control circuit for the chuck 15 and the machine 2 takes over the machining operation. At the same time, as soon as the prepositioning chuck 16 has released the pipe to the chuck 15, it starts its return movement. By this time, another pipe has been positioned on the rolls 7 and, as the chuck 16 moves rearwardly, its movement is discontinued by the breaking of the circuit through its prods 27 by the paint band on the next succeeding pipe, whereby it is in position to receive the next length of pipe and advance it in the same manner.

At each operation of the racks 13, the pipes are advanced from one row of rolls to the other. When the pipe is advanced to the rolls 9, the same operation is repeated with respect to the opposite uncropped end as was effected when the pipe was placed on the rolls 7. Further, the prepositioning chuck 31 operates in the fashion identical to that of the prepositioning chuck 16 so that the cycle is repeated, if desired, at the opposite end if both ends are to be cropped. If only one end of the pipe is to be cropped, then the circuits to the rolls 9 and 10 and to the machine 3, are opened and the rolls 9 and 10 merely act as temporary stations, awaiting transfer of the pipe to the opposite side of the transfer rack to the discharge skid.

Accordingly, the word "chuck," when used herein in describing the prepositioning chuck, is used in its broad and general sense and is not limited to supports which must grip the workpiece, but includes also mere non-gripping supports. In the form illustrated, the chuck 16 is one which positively grips the pipe or work piece and feeds it to the feed chuck 15 and then releases it. The feed chuck 15 then positively grips the work piece to feed it to the machine. However, since there is no substantial resistance to the movement of the work piece by the prepositioning chuck 16 into the chuck 15, the prepositioning chuck need not positively grip the work piece. It is sufficient merely that it support the weight of the work piece while moving it endwise. Thus, a magnetic grip or even a simple non-gripping support is a satisfactory chuck in many instances where speed and inertial stresses are not too great.

Having thus described my invention, I claim:

1. An apparatus for positioning a length of stock in an exact position endwise preparatory to machining the stock at a predetermined location on the stock, and comprising supporting means to support the stock in an endwise approximate position, a prepositioning chuck movable endwise of the stock to a preselected advanced discharge position wherein it holds the stock in position for gripping by a feed chuck by which the stock is to be fed to a machine, and to starting receiving positions, which are retracted relative to the stock and to the discharge position, wherein it is in a position for receiving the stock while the stock remains in an endwise approximate position, power means for moving the prepositioning chuck to said positions, selectively, signal means on the stock in preselected position relative to the said location on the stock, control means responsive to said signal means for stopping movement of the prepositioning chuck by the power means in a starting receiving position along its path, relative to said location on the stock, preselected by the position on the stock of said signal means, means to load said stock into the prepositioning chuck while the chuck remains in the preselected starting receiving position, and means for causing the power means to move the prepositioning chuck in a direction endwise of the stock from said starting receiving position to said discharge position after the stock is loaded in the prepositioning chuck.

2. An apparatus according to claim 1 wherein the signal means are connectible readily to the stock in said preselected location on the stock for endwise movement with the stock.

3. An apparatus according to claim 2 wherein said signal means comprise a marking of electrical insulating material on the stock, and the control means includes an electric control circuit with a contact device therein which completes, through the stock, a circuit which is interrupted by the material upon engagement of the contact device with the material.

4. An apparatus according to claim 1 and including additionally a work feed chuck aligned with the prepositioning chuck endwise of the stock and adapted for alignment with a machining head normally in predetermined spaced endwise relation to the head endwise of the stock, means to cause the feed chuck to grip the stock while stock is held by the prepositioning chuck and the prepositioning chuck is in its discharge position, means to release the prepositioning chuck when the chucks are a preselected distance apart, endwise of the stock, and the stock is gripped by the feed chuck.

5. An apparatus according to claim 4 wherein a machine head having a passage through which the stock can pass endwise when fed by the feed chuck is provided, said head is fixed in position endwise of the stock relative to the discharge position of the prepositioning chuck, and the prepositioning chuck is arranged to advance toward the head in a path so located that part of the length of stock between the leading end of the stock and the prepositioning chuck can pass through the head as the prepositioning chuck is advanced.

6. An apparatus according to claim 5 and further including cut-off tools carried by the head, and means to grip the end of the stock between the cut-off tool and the leading end of the stock.

7. An apparatus according to claim 1 and further including a feed chuck aligned with the prepositioning chuck, means supporting the feed chuck for movement endwise of the path of the prepositioning chuck, means to cause the feed chuck to grip the stock when the stock is moved to discharge position by the prepositioning chuck, and means operable thereafter to return the prepositioning chuck to starting position independently of the operation of the feed chuck.

8. A stock feeding apparatus for moving elongated lengths of stock endwise to positions in which operations can be performed at different preselected locations thereon, respectively, and comprising feed means to feed the stock endwise along a predetermined path to an endwise approximate position, means to stop the stock in said approximate position, a prepositioning chuck movable in a positioning path parallel to and alongside said predetermined path from preselected starting positions wherein the prepositioning chuck is retracted and receives lengths of stock, respectively, to a discharge position wherein it holds the stock in position for gripping by a feed chuck by which the stock is to be fed to the machine, a machine head aligned, endwise of the positioning path, with the prepositioning chuck, power means to move the prepositioning chuck along said path, signal means on the stock, control means operated by the signal means and controlling the power means in response to the signal means to stop the prepositioning chuck in one of the preselected starting positions along the positioning path relative to the signal means, means to transfer the stock transversely of its length to said prepositioning chuck while the stock is in said approximate position and the prepositioning chuck is in said one preselected one of said starting positions, and means to cause the power means to move the prepositioning chuck generally endwise of the stock to said discharge position from said preselected one of its starting positions after the stock is loaded in the prepositioning chuck.

9. An apparatus for positioning a length of stock in an exact position endwise preparatory to machining and comprising feed and supporting means to support and feed the stock endwise along a predetermined path into an endwise approximate position and to stop the stock in said approximate position, a prepositioning chuck movable parallel to said path to an advance discharge position wherein it holds the stock in position for gripping by a feed chuck by which the stock is to be fed to a machine, and to starting receiving positions, which are retracted relative to the stock and to the discharge position, wherein it is in a position for receiving the stock while the stock remains in an endwise approximate position, power means for moving the prepositioning chuck to said positions, selectively, signal means on the stock in a location in preselected spaced relation to the leading end of the stock, control means responsive to said signal means for stopping movement of the prepositioning chuck by the power means in a starting receiving position along its path relative said location preselected by the location on the stock of said signal means, means to load said stock into the prepositioning chuck while the prepositioning chuck remains in the preselected starting receiving position, and means for subsequently causing the power means to move the prepositioning chuck endwise of the stock from said preselected starting receiving position after the stock is loaded in the prepositioning chuck to said discharge position.

References Cited in the file of this patent

UNITED STATES PATENTS

| | | |
|---|---|---|
| 2,690,572 | Thompson | Oct. 5, 1954 |
| 2,850,141 | Bishop | Sept. 2, 1958 |
| 2,868,349 | Edmonds | Jan. 13, 1959 |

UNITED STATES PATENT OFFICE
CERTIFICATE OF CORRECTION

Patent No. 3,055,245　　　　　　　　September 25, 1962

John G. McKay

It is hereby certified that error appears in the above numbered patent requiring correction and that the said Letters Patent should read as corrected below.

Column 1, line 52, for "been" read -- to be --; column 3, line 52, for "were" read -- where --; column 4, line 16, for "probles" read -- prods --; lines 17 and 21, for "probes" read -- prods --; line 37, for "new" read -- now --; line 44, for "effect" read -- affect --; column 5, lines 32, 36 and 72 and column 6, line 9, for "probes" read -- prods --; column 11, line 7, after "relative" insert -- to --.

Signed and sealed this 26th day of February 1963.

(SEAL)
Attest:

ESTON G. JOHNSON
Attesting Officer

DAVID L. LADD
Commissioner of
Patents